United States Patent [19]

Beckett

[11] Patent Number: 4,552,614

[45] Date of Patent: Nov. 12, 1985

[54] DEMETALLIZING METHOD AND APPARATUS

[75] Inventor: Donald E. Beckett, Mississauga, Canada

[73] Assignee: Beckett Packaging Limited, Mississauga, Canada

[21] Appl. No.: 621,609

[22] Filed: Jun. 18, 1984

[51] Int. Cl.[4] .......... C23F 1/02; B44C 1/22; C03C 15/00; C03C 25/06

[52] U.S. Cl. .......... 156/640; 156/345; 156/656; 156/659.1; 156/665

[58] Field of Search .......... 156/345, 640, 642, 656, 156/659.1, 665, 902; 252/79.5; 134/122 R, 198

[56] References Cited

U.S. PATENT DOCUMENTS 2,895,814 7/1959 Clark .......... 156/640

3,647,508 3/1972 Gorrell .......... 252/79.4 X 4,242,378 12/1980 Arai .......... 156/659.1 X 4,398,994 8/1983 Beckett .......... 156/659.1

*Primary Examiner*—William A. Powell

*Attorney, Agent, or Firm*—Sim & McBurney

[57] ABSTRACT

Demetallizing method and apparatus capable of high speed continuous production of selectively patterned metallized polymeric film useful in packaging products are disclosed. Aqueous etchant solution is spray applied to the metallized surface having a pattern of etchant-resistant material applied thereto, the spent etchant solution is spray washed from the surface, and the washed web is dried by hot air drying. Etchant removes metal from exposed areas of the surface of the film while leaving the pattern unaffected, so as to provide a desired visible pattern.

29 Claims, 12 Drawing Figures

DEMETALLIZING METHOD AND APPARATUS

FIELD OF INVENTION

The present invention relates to formation of packaging material by selectively demetallizing metallized plastic film and apparatus for effecting the same.

BACKGROUND TO THE INVENTION

In my U.S. Pat. No. 4,398,994, I have described in continuous method of forming decorative patterns of aluminized plastic film and the use of such patterned film in packaging. As is described therein, a web of aluminized polymer film is printed with a pattern of etchant-resistant material, corresponding to the pattern desired on the aluminized surface. Aqueous sodium hydroxide solution having a concentration of up to about 25 wt. % is applied, at a temperature of about 15° to about 100° C., across the whole width of the web to contact the pattern on the web. The sodium hydroxide solution is allowed to remain in contact with the web as it is conveyed for about 0.1 to about 10 seconds to permit the sodium hydroxide to dissolve aluminum only from areas of the web not having the pattern of etchant-resistant material applied thereto. The spent sodium hydroxide solution is washed from the web to leave the pattern of etchant-resistant material on the transparent polymeric film. The various steps of the operation are effected consecutively at a web speed of up to about 1000 ft/min.

The apparatus illustrated in the aforementioned patent utilizes rollers dipping into baths of liquid to effect the various steps. This manner of application of etchant and of wash water has been found to be somewhat inefficient in ensuring a consistent product at high speeds of operation and also is uneconomical with respect to utilization of sodium hydroxide etchant.

SUMMARY OF INVENTION

In accordance with the present invention, the drawbacks of the prior art apparatus have been overcome to enable rapid, high speed operation to be effected to produce a consistent product with economical usage of etchant. The apparatus and procedure may be used on rolls of aluminized or other metallized polymer film preprinted with the pattern of etchant-resistant material, or may include an in-line printing operation to form the pattern of etchant-resistant material on the film.

The present invention utilizes a series of sprays of heated sodium hydroxide solution which impinge upon the patterned surface, scrapers which assist in removal of etched material, warm water sprays which wash the spent etchant from the film surface, hot air drying of washed film, and chilled roll cooling of the air-dried film.

The patterned polymer film produced by the procedure and apparatus of the invention is useful in packaging a variety of products. The pattern which results may be simple or intricate, or may be transparent or pigmented.

DESCRIPTION OF PREFERRED EMBODIMENT

Figure 1A:
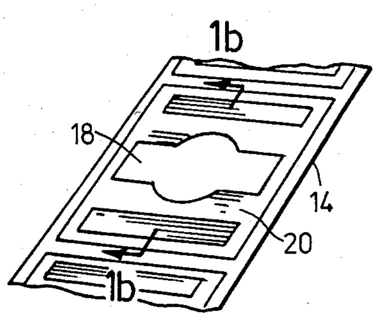
FIG. 1*a* is a perspective view of a web of metallized plastic film having a decorative pattern applied thereto and in a form prior to applicaiton of etchant solution thereto.
Figure 1B:
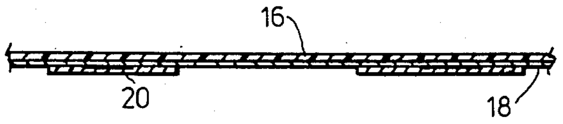
FIG. 1*b* is a sectional view taken on line b—b of FIG. 1*a;*
Figure 2A:
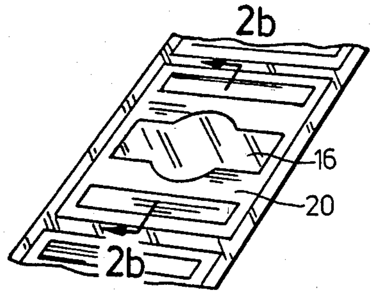
FIG. 2*a* is a perspective view of the metallized plastic web after caustic application.
Figure 2B:
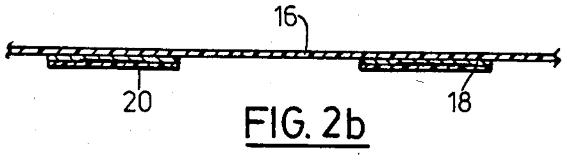
FIG. 2*b* is a sectional view taken on line b—b of FIG. 2*a;*

Referring to the drawings, there is illustrated therein a demetallizing machine 10 for selective demetallizing of a web of metallized plastic film. A roll 12 of such film is provided which is preprinted with etchant resistant material in a pattern of areas of the metal surface which it is desired not to be etched in the final product. As may be seen in FIGS. 1*a* and 1*b*, the web 14 of metallized film comprises a continuous substrate flexible polymer film 16, a continuous thin metal film 18 adhered to the substrate film 16, and a discontinuous pattern of etchant-resistant material on the metal film 18.

Although the invention is illustrated with respect to a demetallizing apparatus for processing a preprinted metallized plastic film with the preprinting being effected in a separate operation, the pattern printing step may be effected in line with the etching operations effected in the demetallizing apparatus and described below.

The substrate polymer film 16 may be any convenient flexible polymeric material chemically resistant to the etchant and typically is a polyester material, for example, that sold under the trade mark "Mylar". The polymer material usually is transparent but may be translucent. The metal film 18 adhered to the plastic film 16 may be any convenient metal which can be removed from the surface of the substrate by chemical etching. The metal usually is aluminum, but other metals, such as copper, may be used. The thickness of the metal film 16 may vary widely within the range of about 10 to about 1000Å, preferably about 300 to 600Å. In the case of aluminum, the chemical etchant commonly is aqueous sodium hydroxide solution and the description of the preferred embodiment which follows is directed to this combination.

The roll 12 of patterned film is mounted at one end of the machine 10 by quick-connect and -disconnect mounting devices 13, which permit a full roll 12 to be quickly and easily mounted to permit the web 14 to be drawn from the roll 12. The roll 12 rotates on axles 15 which are received by the mounting devices 13 and has a disk 17 mounted at one end for rotation therewith. A brake caliper 19 mounted to the apparatus 10 receives the rotating disk 17 therein for application of braking to the roll 12 when the driving force for the web 14 (described below) is shut off, to prevent unreeling of web 14 under the momentum of the driving force.

A web 14 of the patterned aluminized plastic film is drawn upwardly from the roll 12 over a first pair of rolls 22 and 24 before passing in a gentle downward slope from roll 24 to spreader rolls 26. Between the rolls 24 and 26, upstanding walls 27 act as spray shields to prevent accidental discharge of hot etchant solution through the sides of the apparatus 10.

Figures 3, 4:
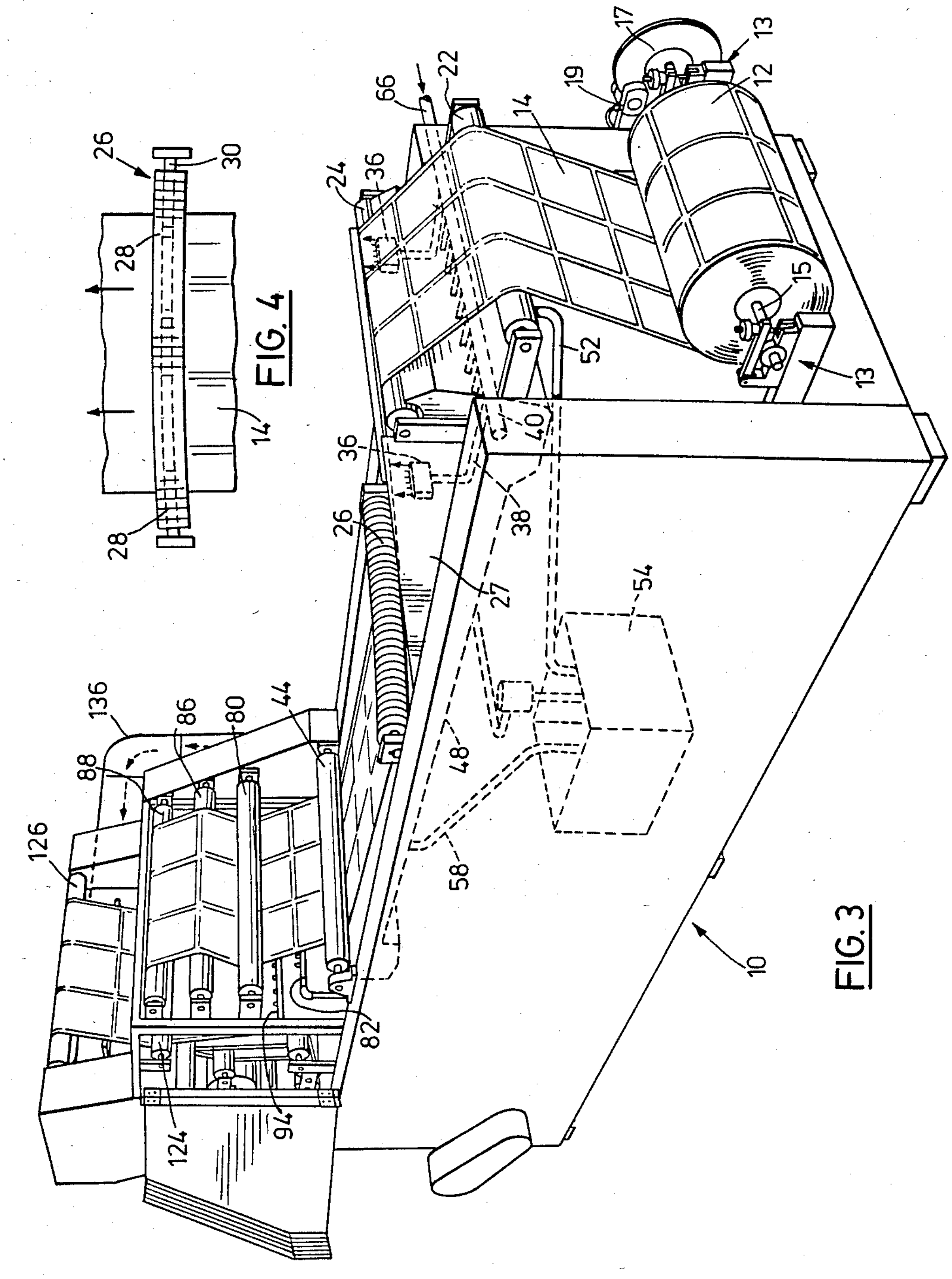
FIG. 3 is a perspective view of a demetallizing machine constructed in accordance with one embodiment of the invention.
FIG. 4 is a plan view from above of the spreader rollers used in the machine of FIG. 3.
Figures 5, 10:
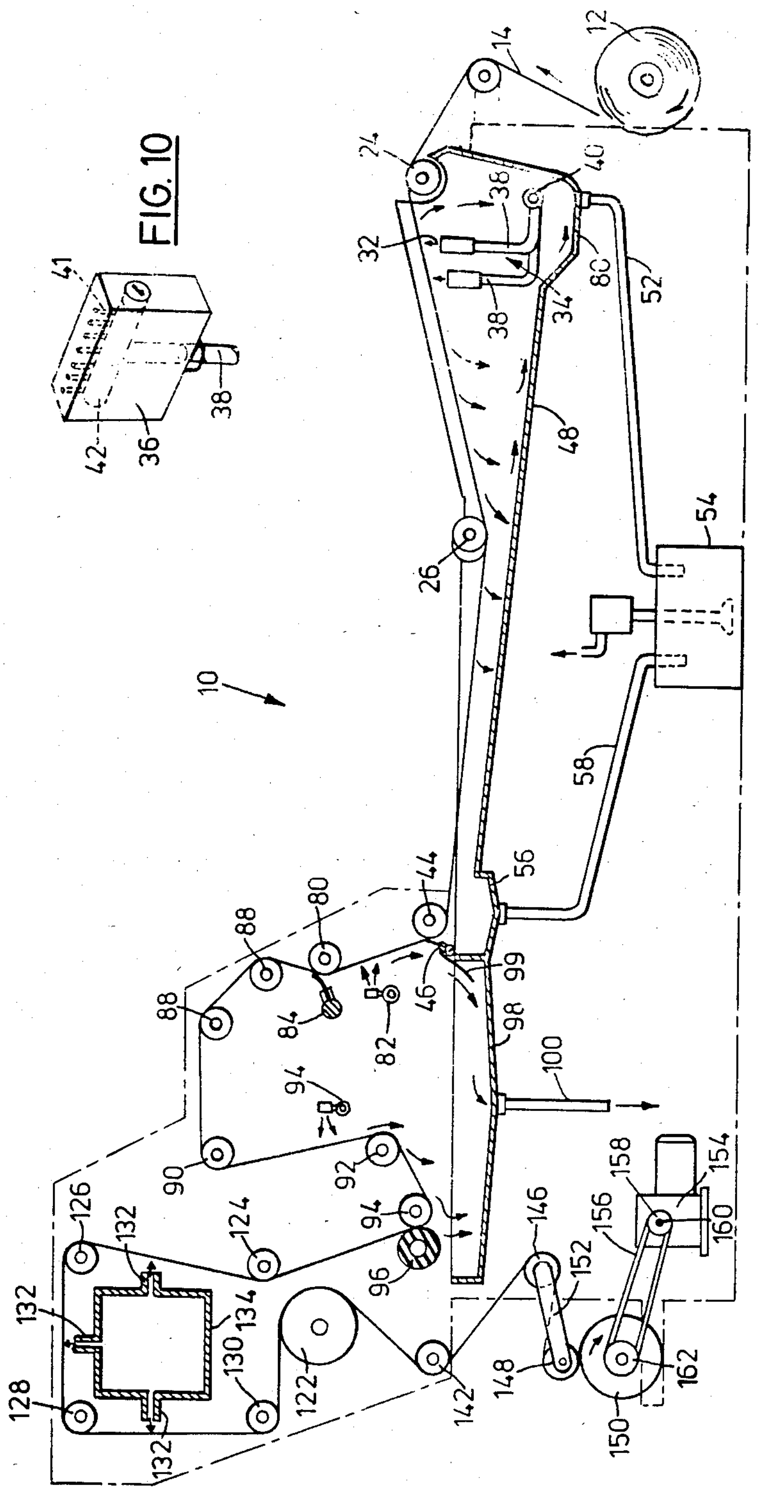
FIG. 5 is a schematic side view, with parts cut away, of the machine of FIG. 3.
FIG. 10 is a detail of one of the spray heads used to apply etchant to the web.

The spreader rolls 26 comprise a series of rubber rolls 28 mounted on a stationary shaft 30 (FIG. 4) which is bowed forwardly in the direction of movement of the web 14. As the rubber rollers 28 rotate under the influence of the web 14 passing them, they compress at the narrow side, which causes the web 14 to spread and be smoothed out on the downstream side of the spreader rolls 26.

The patterned metallized surface of the web 14 is the underside thereof during passage between the rolls 24 and 26 and is exposed to upwardly-directed jets 32 of hot aqueous etchant impinging thereon from dispensing nozzles 34 located adjacent the rolls 24. The dispensing nozzles take the form of a plurality of individual nozzle heads 36 located in two banks spaced apart in the longitudinal direction of the web 14 and extending for the width of the web 14. The individual nozzle heads 36 are connected by feed pipes 38 to a header pipe 40 to which is fed hot sodium hydroxide etchant solution, in a manner described in more detail below with respect to FIG. 7.

Each of the individual nozzle heads 36 includes a plurality of individual spray openings 41 for the ejection of a plurality of individual jets of hot aqueous sodium hydroxide solution from a common header 42 fed by the feed pipe 38. The individual feed pipes 38 to the nozzle heads 36 may be fitted with valves or other flow control devices (not shown), so that the hot aqueous sodium hydroxide solution may be directed to selected ones only of the nozzle heads 36, depending on the pattern to be etched.

By the utilization of jet-spray impingement application of the aqueous etchant solution on the exposed metal surface using the nozzle head 36, a considerable enhancement in the efficiency of etching is achieved, when compared with roll contact application of etchant solution described in my earlier application. At high speeds of operation, this increased efficiency results in a more consistent product than was attained using my prior roll application procedure. In addition, the ability to spray apply the etchant chemical to selected areas only of the width of the web 14, depending on the pattern to be etched, leads to more economic use of the aqueous etchant chemical than my prior application of such chemical across the whole width of the web, irrespective of the pattern thereon.

Following the roll 26, the web 14 travels in a gentle upward path to a further roller 44, which has a scraper 46 associated therewith which assists in the removal of etched metal and spent etchant solution from the surface of the web 14. A drip tray 48 is located below the rolls 24, 26 and 44, so as to collect spent aqueous etchant solution for processing and recycle. The drip tray 48 has a generally downwardly-sloping surface from adjacent the downstream roll 44 to adjacent the upstream roll 24, so that collected spent aqueous etchant solution flows towards and is collected in a sump 50 adjacent the roll 24 and thence flows by a drain pipe 52 to a holding tank 54. A second sump 56 is provided below the roll 44 to collect the spent aqueous etchant solution removed by the scraper 46. The collected spent aqueous etchant material then flows by pipe 58 to the holding tank 54.

As soon as the hot aqueous sodium hydroxide solution in the sprays 32 engages the exposed metal areas of the web 14, etching of the metal commences and, by the time the web reaches the roll 44, is substantially complete. The temperature and concentration of the etchant solution is coordinated with the web speed to achieve this result. Usually, the hot aqueous sodium hydroxide solution has a temperature of about 50° to about 95° C. and the concentration of sodium hydroxide solution preferably is in the range of about 5 to about 10 wt. %.

Etching of the metal occurs only in the areas of the web which are metallized and which are not overprinted with etchant-resistant material, so that a desired pattern result from the etching. As may be seen in FIGS. *2a* and *2b*, the aluminum film 18 has been removed from the substrate film 18 in the areas not covered by the etchant-resistant material 20, but the aluminum film 18 is retained in the areas which are covered by material 20. A visible pattern of metallized and demetallized areas results.

Figure 7:
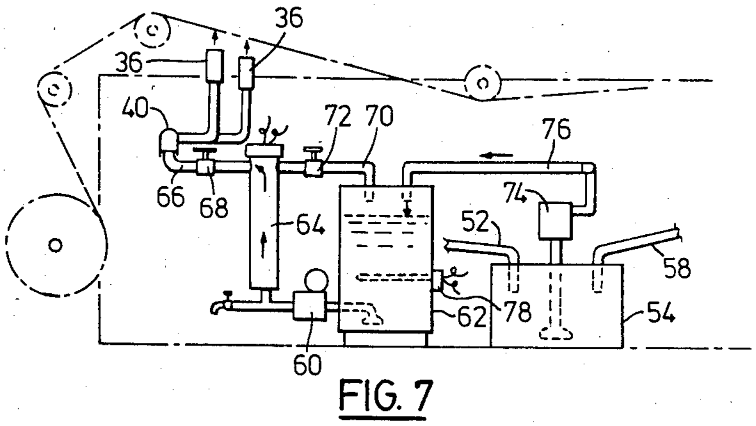
FIG. 7 is an elevational view of the etchant flow system used in the machine of FIG. 3 as viewed along arrow 7 in FIG. 3.

In FIG. 7, there is illustrated detail of the etchant solution recovery and delivery system. The feed of hot aqueous sodium hydroxide solution for the header pipe 40 is effected by pump 60 which pumps sodium hydroxide solution from a reservoir 62 through a heater 64 to a feed pipe 66 which has a valve 68 therein to control the flow of hot aqueous sodium hydroxide solution through the pipe 66. The heater 64 also communicates with a return pipe 70 having a valve therein 72 which permits the pumped sodium hydroxide solution to be recycled to the reservoir 62 by selective opening of valve 72 and closure of valve 68, so as to prevent spraying of sodium hydroxide solution while the roll 12 of printed film is changed, or some similar temporary condition.

The reservoir 62 is fed with a source of solid make-up sodium hydroxide and water (not shown), or concentrated sodium hydroxide solution, as desired, and with spent sodium hydroxide solution recycled by pump 74 through line 76 from the collection tank 54. Sludge removal from the collection tank 54 may be used, as desired. The reservoir 62 is heated by an immersion heater 78.

Following etching of the pattern by the sprayed hot aqueous sodium hydroxide solution, the web 14 next passes through washing and drying operations to remove spent etchant solution from the patterned surface of the web 14 and subsequently to dry the washed wet web 14. The web 14 passes from the roll 44 steeply upwardly to a roll 80 and is sprayed with warm water from a spray head 82 extending across the width of the web to rinse the patterned surface so as to remove residual spent sodium hydroxide solution and residual etched aluminum. A wiper 84 is provided in association with roll 80 to assist in removing wash water from the web 14. Warm wash water is usually employed to improve the efficiency of washing, although room temperature or colder water may be used, if desired. The wash water usually has a temperature in the range of about 25° to about 50° C.

The washed web 14 continues upwardly about rolls 86 and 88 before passing horizontally to roll 90 and steeply angled downwardly and rearwardly to roll 92. Between rolls 90 and 92 the web 14 is again contacted with sprays of warm water from spray head 94 extending across the whole width of the web 14. This second washing is desirable to ensure that the patterned web surface is absolutely clean and free from residual etchant and etched material. The web 14 next travels downwardly and forwardly to a drive roll 94 which provides the drive for the web from the roll 12 to this location of travel of the web 14.

A rubber pinch roll 96 squeezes the web 14 into engagement with the metal surfaced drive roll 94 to ensure that a positive pulling drive is effected on the web 14 by the drive roll 94 while also ensuring that the pattern engaged by the roll 96 is not damaged. The squeezing of the web 14 between the rolls 94 and 96 also removes surface water from the web 14.

The wash water applied to the web 14 by the spray heads 84 and 94 either falls from the web 14 or is removed by action of the pinch roll 96 and the spent wash water is collected in a drip tray 98 which extends under the path of the web from the wiper 46 to the drive roll 94. A rinse water deflector 99 is provided adjacent the wiper 46 extending across the width of the machine 10 to deflect spent wash water in this region into the drip tray 98. The drip tray 98 communicates with a drain line 100 to enable the collected spent wash water to be sewered.

Figure 8:
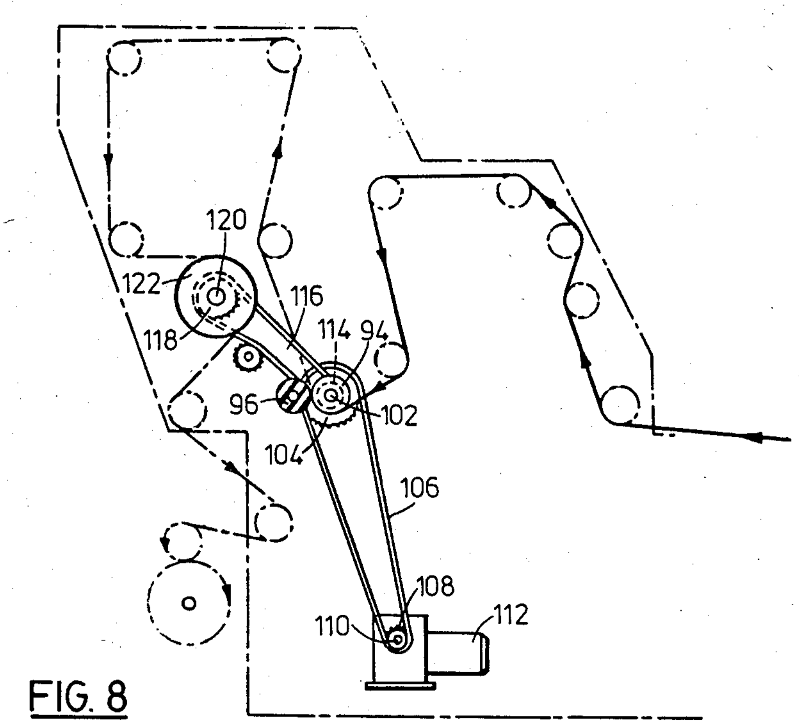
FIG. 8 is an elevational view of the main drive mechanism for the web of metallized plastic film.

Details of the drive mechanism for the rolls 94 and 96 are shown in FIG. 8. As seen therein, the roll 94 is fixedly mounted on an axle 102 onto which is also fixedly mounted a sprocket wheel 104. An endless drive chain 106 engages the sprockets of sprocket wheel 104 and also those of a second sprocket wheel 108 fixedly mounted on the drive shaft 110 of drive motor 112.

The axle 102 has a further small sprocket wheel 114 mounted thereon about which is trained an endless drive chain 116 which is also trained about a sprocket wheel 118 fixedly mounted on a shaft 120 to impart rotary motion to a chiller roll 122 also fixedly mounted on shaft 120. The chiller roll 122 functions in a manner described in more detail below. The drive motor 112 rotates the sprocket wheel 108 and this rotary motion is imparted to the roll 94 through chain 106. The roll 96 is free wheeling and is rotated by the squeeze engagement of rolls 94 and 96 on the web 14.

Positive drive for the web 14 beyond the pinch roller 96 is achieved using an independent drive mechanism associated with web take-up roll, as described in more detail below.

Following washing of the etched film during the path of movement of the web 14 between the roll 44 and the roll 94, the washed clean patterned web surface is dried. For this purpose, the web 14 passes upwardly about rolls 124 and 126, horizontally between rolls 126 and 128 and downwardly between rolls 128 and 130. Between each successive pair of rolls 124, 126; 126, 128; and 128, 130, the web 14 is engaged by a stream of hot air across the whole width thereof ejected through hot air outlet slots 132 from a hot air chamber 134. Such a plurality of air drying streams are employed to ensure that the web 14 is completely dried.

Figure 6:
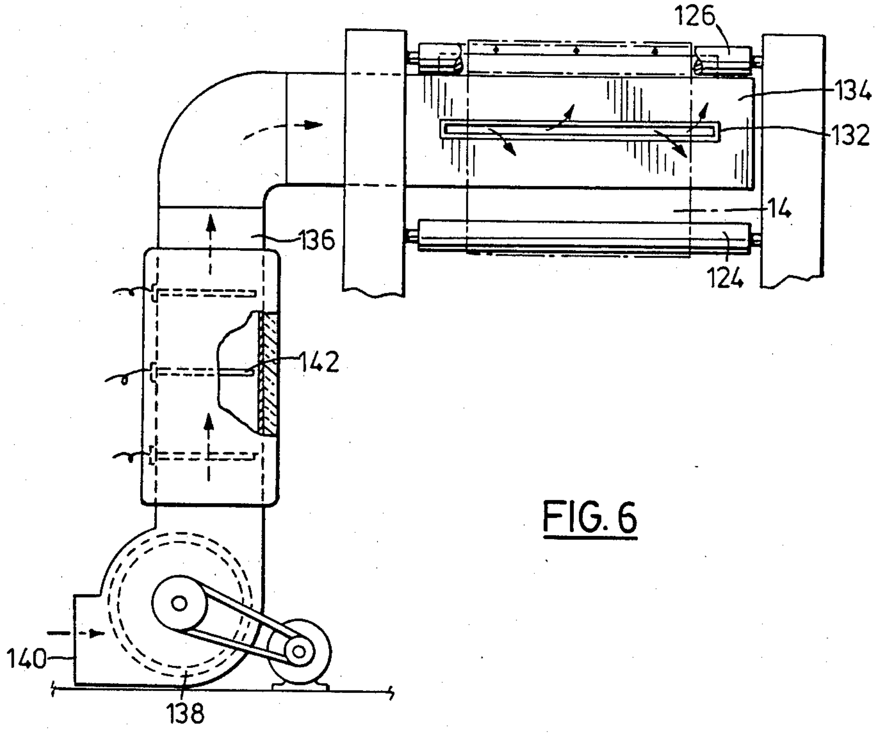
FIG. 6 is a front elevational view of drying mechanism used in the machine of FIG. 3 and as seen along arrow 6 in FIG. 5.

Details of the hot air feed system are shown in FIG. 6. As seen therein, the hot air chamber 134 is connected to a feed pipe 136 through which air is directed by a fan 138 from an external air inlet 140. Heater elements 142 are provided in the feed pipe 136 to heat the incoming air to the desired temperature. The engagement of the hot air streams ejected from the chamber 134 through the outlet slots 132 onto the patterned surface of the web 14 removes any residual moisture from the web surface and dries the web bone dry.

The dry web 14 next passes over the chilled roll 122 to cool the web 14 to ambient temperature, so that the web 14 is dimensionally stable for wind-up and the original pattern is maintained. The chilled roll 122 is fed with cold water from a refrigeration plant (not shown) to maintain the desired temperature. As noted earlier, the chilled roll 122 is driven in rotation by motor 112. The chilled web 14 then passes about rolls 144, 146 and 148 to a wind-up roll 150. The roll 148 rests on the wind-up roll 150 and is mounted on a yoke 152 to pivot about the axle of roll 146 as the size of the wind-up roll 150 increases.

Figure 9:
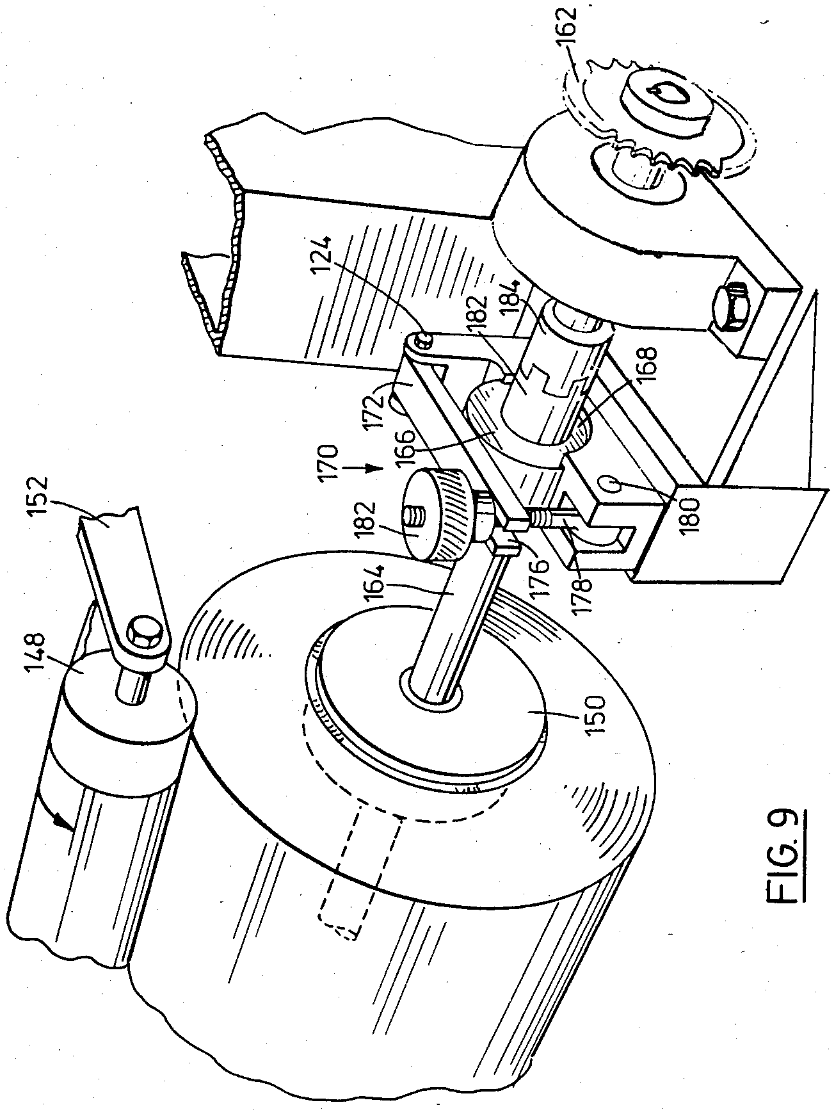
FIG. 9 is a detail view of the drive for the take-up roll.

The wind-up roll 150 is driven by a drive motor 154 through an endless drive chain 156 trained about a sprocket wheel 158 mounted on the drive shaft 160 of the drive motor 154 and also about a sprocket wheel 162 mounted on the axle 164 of take up roll 150. The drive motor 154 used to drive the wind-up roll and thereby to impart motive force to the web 14 downstream of the drive roll 94 is separate from motor 112 used to rotate the web drive roll 94. As may be seen in detail in FIG. 9, the take-up roll 150 is mounted for rotation by bearings 166 mounted in seatings 168 and maintained therein by a quick-connect device 170 having a structure the same as that of the quick-connect device 13 on the feed roll 12 discussed above.

The quick-connect device 170 comprises an overlying bar 172 pivoted about a horizontal pivot 174 and having a generally U-shaped slot 176 at its forward end which is constructed to receive a threaded shaft 178 which is pivotally mounted at its lower end to an axle 180 and has a knob 182 threadedly engaged thereon for tightening down on the bar 172 to hold the bearing 166 in place and for loosening and releasing the shaft 178 from the slot 176, so that the bar 172 can be pivoted upwardly about the pivot 174 to release the pivot 166 for removal of the take up roll. The shaft 164 of the take up roll 150 is connected to the drive mechanism through intermeshing castellated shaft sections 184 and 186.

The arrangement of rolls in the demetallizing machine 10 which define the path of the web 14 illustrated in the drawings is one convenient arrangement to permit the consecutive steps of etching, washing and drying to be effected in a compact piece of equipment. It will be obvious to those skilled in the art that alternative arrangements of rolls to define different paths of movement of web 14 may be used to achieve the same result.

As noted earlier, the metal film is usually aluminum and the etchant usually is aqueous sodium hydroxide solution. Other combinations of metal film and suitable etchant, however, may be used.

Under these reaction conditions, the etching of the aluminum occurs rapidly and high speed operation, usually up to about 1000 ft/min can be achieved in a compact demetallizing machine, preferably about 100 to about 700 ft/min.

The demetallizing machine 10 illustrated in the drawings is capable of operating at speeds which are compatible with those of flexographic and gravure printing presses, so that the demetallizing operation may be run on-line with the patterning of the film on modern film-printing machinery. As noted earlier, the machine, however, may be run as a stand-alone unit to demetallize rolls of preprinted film.

The roll 150 of clean dried patterned film which results from the demetallizing operation may be used as is as a packaging material for a variety of products. The patterned film often is laminated with another polymeric film to impart desirable properties thereto, for example, heat sealing properties and improved strength properties, prior to use of the laminate as a packaging material. In the event that the patterned film is not thoroughly dry or is contaminated in any way, problems often arise in the lamination operation.

When lamination with the patterned web is to be effected, such operation may be carried out separately on the roll 150 or may be effected on-line with the demetallizing operation following the drying of the patterned web.

The demetallizing machine 10 illustrated in the drawings may be used efficiently to remove any desired proportion of the metal present on the web surface, depending on the pattern desired. The web speed and other operating parameters, for example, sodium hydroxide concentration and temperature may be adjusted to take into account varying thicknesses of metal film.

A variety of sensors may be used to monitor continuously certain parameters of the operation and the output of such sensors may be used to effect automatic control of the overall demetallizing operation. The information generated by the sensors may also be displayed on a monitor screen to enable manual adjustments to be made, as required, or may be printed out to enable a record of a run to be made. A dedicated microcomputer may be used to process the sensor outputs and generate the appropriate control signals in response to the sensed outputs.

Information relating to metal film thickness and plastic film type also may be inputted to the microcomputer to predetermine the operating parameters of the machine for a particular web.

Sensors may be used to determine spray nozzle temperature, sodium hydroxide solution tank temperature and etchant-solution flow rate, and suitable adjustment may be made as required to ensure that a predetermined temperature of etchant solution applied to the web at a predetermined flow rate is maintained. The pH of the etchant solution may be sensed and adjusted as required so as to ensure that the desired strength of etchant solution is maintained.

The tension of the web 14 is another parameter that may be sensed. A desired tension is preset, depending on the identity of the plastic substrate used in the web, and then the tension is monitored continuously and adjusted as required to ensure that the appropriate tension is maintained.

It is important to produce a printed demetallized web which is bone dry and absolutely clean, especially when the web is to be laminated with other polymer films. The dryness of the web may be sensed and the squeeze roll pressure, web speed and/or temperature of drying air may be varied as required to ensure the production of a bone dry web. Adequate washing is ensured by controlling the wash water temperature and flow rate.

SUMMARY OF DISCLOSURE

In summary of this disclosure, the present invention provides an improved method and apparatus for selectively etching a metallized polymeric film to achieve continuous reliable high speed operation. Modifications are possible within the scope of this invention.

What I claim is:

1. A continuous method of forming a pattern on a metallized polymer film, which comprises:
   providing said metallized polymer film as a continuous web and conveying said continuous web successively through an etchant solution-applying zone, a washing zone and a drying zone,
   continuously spray applying an aqueous etchant solution to the metallized surface of said continuous web in said etchant solution applying zone, said continuous web having also located thereon a pattern of etchant-resistant material corresponding to the desired pattern and masking metal from the etchant solution, thereby to effect removal of metal only from the areas of said web contacted by the etchant solution and not having the etchant-resistant material applied thereto,
   continuously washing spent etchant solution from said continuous web in said washing zone, and
   continuously drying the resulting washed web in said drying zone.
2. The method of claim 1 wherein said metal covers only part of said film surface and said etchant solution is selectively spray applied to the metallized part of said film.
3. The method of claim 1 wherein said metal is aluminum and said aqueous etchant solution is aqueous sodium hydroxide solution.
4. The method of claim 1 wherein said web passes generally horizontally in said aqueous etchant solution applying zone and said spray application of said aqueous etchant solution is effected by a plurality of etchant solution sprays impinging on the underside of said web.
5. The method of claim 4 wherein said sprays are arranged as at least one set located generally transverse to the direction of movement of the web.
6. The method of claim 5 wherein individual sprays in said jet are selectively operable to enable application of aqueous etchant solution to selective areas of said web.
7. The method of claim 4 wherein said web is washed in said washing zone by the spray application of warm water onto the etched surface.
8. The method of claim 7 wherein said spray application is effected in a plurality of sequential applications of sprays of warm water across the width of the web.
9. The method of claim 7 wherein said spray application is effected during both initial upward and subsequent downward movement paths of said web, and the film is subsequently squeezed to remove excess water from the surface thereof.
10. The method of claim 4 wherein said web is dried in said drying zone by impinging hot air onto the washed web and the hot air-dried web is subsequently cooled to ambient temperature.
11. The method of claim 10 wherein said hot air impingement is effected in a plurality of sequential applications of a stream of hot air across the width of the web.
12. The method of claim 3 wherein said web is unwound from a roll of metallized film having said pattern of etchant-resistant material preprinted thereon and the dried web is wound onto a take-up roll.
13. The method of claim 1 wherein said web is pull driven through said etchant solution applying zone and said washing zone by a first drive means and said web is pull driven through said drying zone by a second drive means independent of said first drive means.

14. An apparatus for effecting continuous formation of a repetitive pattern on a web of metallized polymer film, which comprises:

feed means for continuously feeding said web having applied thereto a pattern of etchant-resistant material on the metallized surface of the film and masking metal underlying the etchant-resistant material, flow path defining means defining the flow path of said web through said apparatus and further sequentially defining etchant solution applying station means for applying and maintaining etchant-solution in contact with said web as said web passes therethrough, wash water applying station means for applying wash water to said web to remove spent etchant-solution therefrom as said web passes therethrough, and drying station means for drying said washed web as said washed web passes therethrough, said etchant-solution applying station means including etchant solution spray application means for impinging aqueous etchant solution onto the patterned surface of said web, and take up means for continuously accumulating the dried web exiting said drying station means.

15. The apparatus of claim 14 wherein said flow path defining means comprises a plurality of rolls over which said web passes.

16. The apparatus of claim 14 wherein said spray application means comprises a plurality of spray nozzles.

17. The apparatus of claim 16 wherein said spray nozzles are selectively actuable to permit impingement of said aqueous etchant solution onto selected portions only of said web.

18. The apparatus of claim 14 wherein said etchant-solution applying station means comprises a plurality of rollers defining a generally horizontal web flow path, said spray application means located below and adjacent an upstream end of said flow path and arranged with at least one set of a plurality of spray nozzles arranged generally transversely to the flow path for impingement on the underside of said web, and spent etchant solution catchment means located below said horizontal flow path for catching spent etchant solution falling from said web in said horizontal flow path.

19. The apparatus of claim 18 wherein said spray nozzles comprise a plurality of nozzle heads arranged in two rows across the width of said etchant-solution applying station and communicating with a common source of etchant solution, each said nozzle head having a plurality of spray openings therein for impingement of sprays of etchant solution on the underside of the web.

20. The apparatus of claim 18 wherein said spent etchant catchment means is connected to etchant solution recycle means.

21. The apparatus of claim 14 wherein said wash water applying station means comprises a plurality of rollers defining a web flow path therethrough, wash water spray applying means for effecting said wash water application to said web, spent wash water catchment means located below said web flow path for catching spent wash water falling from said web in said web flow path, and squeeze roll means at the exit from said wash water applying station means for removing wash water from said web thereat.

22. The apparatus of claim 21 wherein said plurality of rollers define a flow path which includes two generally vertical web flow paths and said wash water spray applying means are located adjacent both the upwardly-extending and downwardly-extending vertical flow paths.

23. The apparatus of claim 21 wherein said squeeze roll means is driven by drive motor means and effects pulling driven motion on said web through said etchant-solution applying station means and said wash water applying station means.

24. The apparatus of claim 14 wherein said drying station means comprises a plurality of rollers defining a web flow path therethrough, hot air impingement means for impinging hot air against the web to dry the same, and chilled roll means for cooling said web after said hot air drying.

25. The apparatus of claim 24 wherein said hot air impingement means comprises a hot air chamber and a plurality of elongate slots in said chamber for discharging hot air into impingement with the web in said web flow path through said drying station means.

26. The apparatus of claim 25 wherein said hot air chamber communicates with an air feed passageway and a fan driving air into the feed pasageway and thence to the hot air chamber, said air feed passageway having heater means therein for heating said driven air during passage through said passageway.

27. The apparatus of claim 25 wherein said plurality of rollers define a first upwardly-extending flow path, a second horizontal flow path and a third downwardly extending flow path, and said hot air impingement means impinges hot air on said web in each said flow path.

28. The apparatus of claim 14 wherein said feed means includes means supporting a roll of said polymer film having said pattern preprinted on the metallized surface thereof, and said take-up means includes means supporting a roll of said dried etched film.

29. The apparatus of claim 14 including first drive means for driving said web through said etchant-applying station means and said wash water applying station means and second drive means for drying said web through said drying station means.

* * * * *